United States Patent [19]

Wood

[11] 4,029,065
[45] June 14, 1977

[54] CARBURETOR

[76] Inventor: Kenneth L. Wood, 4719 4th St. NE., Columbia Heights, Minn. 55424

[22] Filed: Oct. 2, 1975

[21] Appl. No.: 618,748

[52] U.S. Cl. .................. 123/122 AA; 123/122 R; 261/144; 165/51
[51] Int. Cl.² .................................. F02M 31/00
[58] Field of Search ........ 123/122 AA, 122 R, 141; 261/144; 165/51

[56] References Cited

UNITED STATES PATENTS

| 1,213,817 | 1/1917 | Baruch | 123/122 AA |
|---|---|---|---|
| 1,269,753 | 6/1918 | Shum | 123/122 AA |
| 1,825,819 | 10/1931 | Potter | 123/122 AA |

FOREIGN PATENTS OR APPLICATIONS 240,619  12/1959  Australia ........................ 261/144

Primary Examiner—Ronald H. Lazarus
Attorney, Agent, or Firm—Merchant, Gould, Smith, Edell, Welter & Schmidt

[57] ABSTRACT

A procedure and apparatus for improving the efficiency of gasoline engines by passing the air-fuel mixture from the vicinity of the nozzles through a heat exchanger, and causing liquid from the cooling system of the engine to flow through the heat exchanger and provide heat therefor.

1 Claim, 3 Drawing Figures

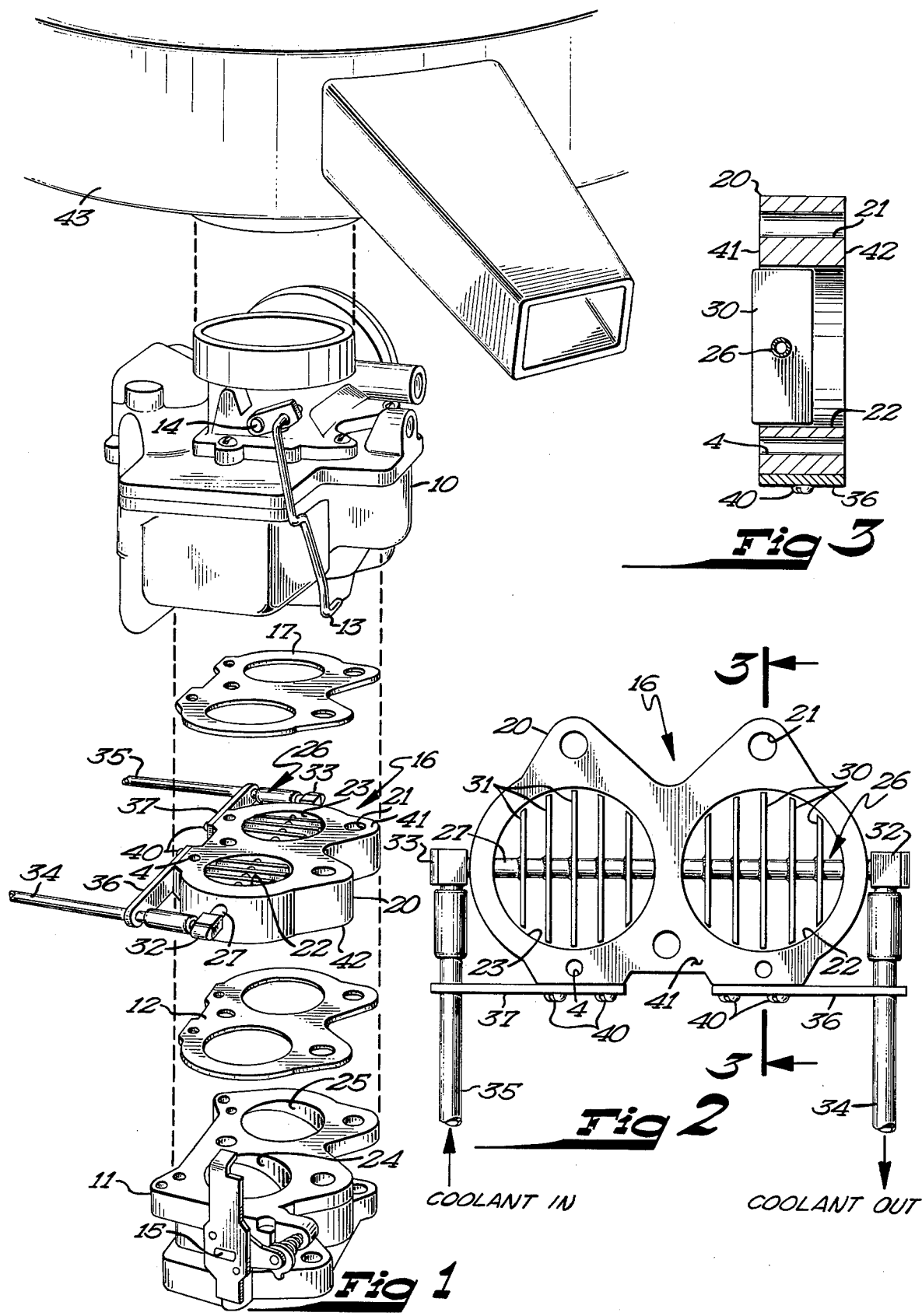

CARBURETOR

BACKGROUND OF THE INVENTION

This invention relates to the field of automotive engineering and particularly to a method of and means for increasing the efficiency of use of fuel by an internal combustion engine having a fuel vaporization system and a liquid cooling system.

It is well known that in the usual automobile engine air is drawn into the engine, during a suction stroke of the piston, past a carburetor nozzle and a carburetor throttle valve to an intake manifold. The throttle valve regulates the flow of air past the nozzle, which aspirates fuel, from a chamber in which its level is maintained constant, to be entrained and vaporized. The efficiency with which the engine consumes fuel is influenced markedly by the carburetor operation: fuel which is not vaporized is largely discharged from the engine unburnt and thus wasted directly, while air more in amount than what is required for vaporization and combustion reduces the temperature of the combustion and thus reduces engine efficiency thermally.

From the above, it follows that an arrangement which increases the degree of vaporization of the liquid fuel for any throttle position and jet adjustment of the carburetor will increase the engine efficiency and hence the mileage of the vehicle — a very desirable consumation in these days of increasing energy shortages.

SUMMARY OF THE INVENTION

The present invention involves inserting in the space between the carburetor nozzle and the intake manifold a finned heat exchanger connected thermally to the cooling system of the engine. By this means warm liquid circulates through the exchanger, so that the conduit and fins are at a temperature, as well as in a position, to maximize vaporization of the fuel. As a matter of fact, it has been found desirable in certain applications to interpose a heat insulation layer between the apparatus of the invention and the carburetor body above it, so that conduction of heat to a location upstream of the heat exchanger is minimized. The location of the heat exchanger is influenced by practical considerations such as available height, carburetor construction details, etc.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 1 is an exploded fragmentary view showing the carburetion system of an internal combustion engine including my invention;

FIG. 2 is a plan view of my heat exchanger and housing; and

FIG. 3 is a sectional view taken along the line 3—3 of FIG. 2.

DESCRIPTION OF THE PREFERRED EMBODIMENT

While the invention may be designed for use with any carburetor, it is shown in FIG. 1 as used with a two-barrel down-draft carburetor of known construction. One such carburetor consists of a main body 10 separable from the top of a throttle body 11 and secured thereto by suitable fasteners, not shown: a gasket 12 is interposed between elements 10 and 11 for sealing purposes. Means including a connecting rod 13 interrelate mechanical movement of a choke valve shaft 14 in body 10 with a throttle valve shaft 15 in body 11.

To practice my invention, a heat exchanger is inserted in the inlet line between the nozzles and the intake manifold: for carburetors of the type just described, I prefer to place the heat exchanger between the main body and throttle body of the carburetor, although other locations may also be used.

The invention interposes an additional component 16 and gasket 17 between gasket 12 and body 10. Component 16 includes a housing 20 in the form of a block of metal having apertures 21 to pass fasteners securing it and body 11 to body 10. Housing 20 is outwardly configured like the upper end of body 11, and has a pair of large apertures 22 and 23 aligned with the throttle openings 24 and 25 in body 11. Contained in housing 20 is a heat exchanger 26, comprising a conduit 27 for heat conducting liquid and sets of fins 30 and 31 secured to conduit 27 in apertures 22 and 23. Housing 20 is cross-bored to provide passage for conduit 27, which extends beyond housing 20 to fittings 32 and 33 at its ends. The conduit is a sufficiently close fit in its passage that no appreciable air leaks past it into apertures 22 and 23. Liquid connection pipes 34 and 35 are connected to fittings 32 and 33, and are supported on housing 20 by brackets 36 and 37 traversed by the pipes and mounted by screws 40.

FIG. 3 shows that conduit 26 is positioned in housing 40 so that fins 30 are not fully enclosed within aperture 22, but project above the upper surface 41 of housing 20 toward body 10, while being also spaced above the lower surface 42 of housing 20. These dimensions are not strictly a part of the invention, but are dictated by the small headroom available in modern engine compartments. Returning for a moment to FIG. 1, it will be appreciated that an air cleaner 43 is conventionally mounted on top of body 10, and this gives a lower limit for the height of the hood, which is desirably kept low. In one application, it was found that a thickness of 1¼ inches for housing 20 could be tolerated, but that a lower portion of this thickness was intruded into from body 11 by the butterfly valves on the throttle shaft, while some space remained unused in body 10 below the nozzles therin. Conduit 26 and fins 30, 31 were positioned accordingly.

Installation of the system includes positioning of housing 20 and connection of conduit 26 to the engine cooling system of the vehicle. The liquid connection must be such that continued flow of liquid through conduit 26 occurs to maintain the conduit and fins 30, 31 at an elevated temperature. This will not be the case, of course, when the engine is first started after a period of disuse, but is true for most of the time the engine is being used. Accordingly, the fuel dispensed by the nozzles in body 10 is discharged on and between the elements of the heat exchanger, so that more perfect vaporization of the fuel takes place because of the elevated vaporizing temperature.

My invention can, of course, be applied to engines having carburetors which do not separate, by placing a heat exchanger at another suitable location in the inlet system such as between the carburetor and the intake manifold.

It has been found that there is some tendency for heat to be conducted from the heat exchanger to housing 20 and thence to body 10, where it might occasionally result in vapor lock of some other imperfection in the fuel system. To prevent this, gasket 17 is made of thermally-conductive material, and is thick enough to severely attenuate the conduction of heat in the path just identified.

From the foregoing it will be evident that by the invention described, the efficiency of an engine in its use of fuel is considerably increased, more particularly in times of low ambient temperature, that the arrangement is simple mechanically and thermally, both to construct and to install, and that it can be readily adapted to use in almost any engine fuel system.

Numerous characteristics and advantges of this invention have been set forth in the foregoing description, together with details of the structure and function of the invention, and the novel features thereof are pointed out in the appended claims. The disclosure, however, is illustrative only, and changes may be made in detail, especially in matters of shape, size, and arrangment of parts, within the principle of the invention, to the full extent indicated by the broad general meaning of the terms in which the appended claims are expressed.

What is claimed is:

1. In combination:

A carburetor main body including at least one nozzle discharging a directed jet of fuel;

a carburetor throttle body including at least one throttle valve for controlling the flow of combustion air past said nozzle;

a heat exchanger having a conduit for liquid flow and plurality of spaced fins carried by said conduit in heat conducting relation thereto;

housing means for mounting said heat exchanger between said main body and said throttle body so that fuel discharged by said nozzle flows over and between said fins before reaching said throttle valve;

and means for connecting said conduit and said heat exchanger for circulation of a fluid therethrough;

in which said housing means comprises a block of metal aperture to provide passage between said nozzle and said throttle valve, and in which the conduit of said heat exchanger extends transversely across said opening in a first direction, and said fins extend transversely there across in a second direction orthogonal with said first direction, and vary in a first dimension in accordance with their positions along said conduit, to agree with the transverse configuration of said passage means; and in which said fins extend beyond said housing means, in the direction of said passage means, towards said nozzle, and terminate somewhat within said housing means, in the direction of said passage means toward said throttle valve, so that in use said conduit is at a desired position between said nozzle and said throttle.

* * * * *